United States Patent
Ash

(10) Patent No.: US 9,586,669 B2
(45) Date of Patent: Mar. 7, 2017

(54) AEROSPACE PROTECTIVE DUST COVER

(71) Applicant: Gentex Corporation, Zeeland, MI (US)

(72) Inventor: Kevin L. Ash, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/551,618

(22) Filed: Nov. 24, 2014

(65) Prior Publication Data
US 2015/0146277 A1    May 28, 2015

Related U.S. Application Data
(60) Provisional application No. 61/908,567, filed on Nov. 25, 2013.

(51) Int. Cl.
| | | |
|---|---|---|
| G02F 1/153 | (2006.01) | |
| G02B 26/00 | (2006.01) | |
| B64C 1/14 | (2006.01) | |
| G02B 27/00 | (2006.01) | |
| G02F 1/15 | (2006.01) | |

(52) U.S. Cl.
CPC ........ B64C 1/1492 (2013.01); G02B 27/0006 (2013.01); G02F 1/15 (2013.01)

(58) Field of Classification Search
USPC .................................................. 359/275–290
See application file for complete search history.

(56) References Cited

U.S. PATENT DOCUMENTS

| | | |
|---|---|---|
| 4,640,583 A | 2/1987 | Hoshikawa et al. |
| 4,646,158 A | 2/1987 | Ohno et al. |
| 4,702,566 A | 10/1987 | Tukude |
| 4,893,908 A | 1/1990 | Wolf et al. |
| 4,917,477 A | 4/1990 | Bechtel et al. |
| 5,004,961 A | 4/1991 | Berner et al. |
| 5,066,111 A | 11/1991 | Singleton et al. |

(Continued)

FOREIGN PATENT DOCUMENTS

| | | |
|---|---|---|
| EP | WO 98/57228 | 12/1998 |
| EP | 0947874 A2 | 10/1999 |

(Continued)

OTHER PUBLICATIONS

R. Sullivan et al., "Effect of Switching Control Strategies on the Energy Performance of Electrochromic Windows," SPIE, vol. 2255, 14 pages, (Feb. 1994).

(Continued)

*Primary Examiner* — Mohammed Hasan
(74) *Attorney, Agent, or Firm* — Price Heneveld LLP; Bradley D. Johnson

(57) ABSTRACT

An aircraft window assembly includes a pressure pane. A bezel is proximate a periphery of the pressure pane and defines an inner opening. The bezel includes an inner wall with a channel. An electro-optic element is disposed in the inner opening and is configured for reception in the channel of the inner wall. The electro-optic element is capable of operation between a transmissive condition and a dimmed condition. A dust cover is proximate the bezel. The dust cover includes an interior substrate and an exterior substrate. The interior substrate and the exterior substrate generally define a gap therebetween. A thermally absorbent liquid is disposed in the gap.

19 Claims, 2 Drawing Sheets

(56) References Cited

U.S. PATENT DOCUMENTS

| | | | |
|---|---|---|---|
| 5,092,939 A | 3/1992 | Nath et al. | |
| 5,124,832 A | 6/1992 | Greenberg et al. | |
| 5,136,419 A | 8/1992 | Shabrang | |
| 5,161,048 A | 11/1992 | Rukavina | |
| 5,202,787 A | 4/1993 | Byker et al. | |
| 5,228,925 A | 7/1993 | Nath et al. | |
| 5,384,578 A | 1/1995 | Lynam et al. | |
| 5,384,653 A | 1/1995 | Benson et al. | |
| 5,390,454 A * | 2/1995 | Coddens | E06B 3/28 160/107 |
| 5,612,847 A | 3/1997 | Malecke et al. | |
| 5,654,736 A | 8/1997 | Green et al. | |
| 5,657,149 A | 8/1997 | Buffat et al. | |
| 5,724,176 A | 3/1998 | Nishikitani et al. | |
| 5,724,187 A | 3/1998 | Varaprasad et al. | |
| 5,725,809 A | 3/1998 | Varaprasad et al. | |
| 5,805,330 A | 9/1998 | Byker et al. | |
| 5,838,483 A | 11/1998 | Teowee et al. | |
| 5,889,608 A | 3/1999 | Buffat et al. | |
| 5,995,273 A | 11/1999 | Chandrasekhar | |
| 6,020,989 A | 2/2000 | Watanabe | |
| 6,045,724 A | 4/2000 | Varaprasad et al. | |
| 6,055,089 A | 4/2000 | Schulz et al. | |
| 6,056,410 A | 5/2000 | Hoekstra et al. | |
| 6,084,702 A | 7/2000 | Byker et al. | |
| 6,166,496 A | 12/2000 | Lys et al. | |
| 6,207,083 B1 | 3/2001 | Varaprasad et al. | |
| 6,210,008 B1 | 4/2001 | Hoekstra et al. | |
| 6,245,262 B1 | 6/2001 | Varaprasad et al. | |
| 6,254,003 B1 | 7/2001 | Pettinelli et al. | |
| 6,407,847 B1 | 6/2002 | Poll et al. | |
| 6,471,360 B2 | 10/2002 | Rukavina et al. | |
| 6,567,708 B1 | 5/2003 | Bechtel et al. | |
| 6,906,632 B2 | 6/2005 | DeLine et al. | |
| 6,924,919 B2 | 8/2005 | Hunia et al. | |
| 7,130,101 B2 | 10/2006 | Rukavina et al. | |
| 8,658,283 B2 * | 2/2014 | Shimatani | A47F 3/0434 428/195.1 |
| 2004/0160660 A1 | 8/2004 | Malvino | |
| 2005/0063036 A1 | 3/2005 | Bechtel et al. | |
| 2005/0156753 A1 | 7/2005 | DeLine et al. | |
| 2005/0200935 A1 | 9/2005 | Liu et al. | |
| 2011/0299170 A1 * | 12/2011 | Harlow | B60R 1/088 359/604 |
| 2013/0161971 A1 * | 6/2013 | Bugno | B60J 3/04 296/97.2 |
| 2015/0098121 A1 * | 4/2015 | Turnbull | G02F 1/163 359/275 |
| 2015/0103389 A1 * | 4/2015 | Klawuhn | E06B 9/24 359/275 |
| 2015/0309383 A1 * | 10/2015 | Taya | G02F 1/1525 359/275 |
| 2015/0354790 A1 * | 12/2015 | Ash | B64D 47/02 362/471 |

FOREIGN PATENT DOCUMENTS

| | | |
|---|---|---|
| EP | 0947875 A2 | 10/1999 |
| EP | 0947876 A2 | 10/1999 |

OTHER PUBLICATIONS

A.W. Czanderna et al., "Durability Issues and Service Lifetime Prediction of Electrochromic Windows for Buildings Applications," Solar Energy Materials & Solar Cells, 56 (1999), 18 pages.

Patent Cooperation Treaty Communication, mailed Dec. 21, 2007, 13 pages.

Communication from the European Patent Office, Supplementary European Search Report, Mailed Aug. 8, 2010, (9 pages).

* cited by examiner

US 9,586,669 B2

AEROSPACE PROTECTIVE DUST COVER

CROSS-REFERENCE TO RELATED APPLICATION

This application claims priority under 35 U.S.C. §119(e) to U.S. Provisional Patent Application No. 61/908,567, filed on Nov. 25, 2013, entitled "AEROSPACE PROTECTIVE DUST COVER," which is incorporated herein by reference in its entirety.

BACKGROUND OF THE DISCLOSURE

The present disclosure generally relates to an aircraft window assembly, and more specifically, to an aircraft window assembly that includes an aerospace protective dust cover.

SUMMARY OF THE PRESENT DISCLOSURE

One aspect of the present disclosure includes an aircraft window assembly having a pressure pane. A bezel is proximate a periphery of the pressure pane and defines an inner opening. The bezel includes an inner wall with a channel. An electro-optic element is disposed in the inner opening and is configured for reception in the channel of the inner wall. The electro-optic element is capable of operation between a transmissive condition and a dimmed condition. A dust cover is proximate the bezel. The dust cover includes an interior substrate and an exterior substrate. The interior substrate and the exterior substrate generally define a gap therebetween. A thermally absorbent liquid is disposed in the gap.

Another aspect of the present disclosure includes an aircraft window assembly having a pressure pane in abutting contact with an inner surface of an exterior pressure pane frame. The pressure pane includes an interior surface and an exterior surface. The interior surface includes an electrophoretic deposition. A bezel is proximate a periphery of the pressure pane and defines an inner opening. The bezel includes an inner wall with a channel. An electro-optic element is disposed in the inner opening and is configured for reception in the channel of the inner wall. The electro-optic element is capable of operation between a transmissive condition and a dimmed condition. A dust cover is proximate the bezel. The dust cover includes an interior substrate and an exterior substrate. A thermally absorbent material is disposed between the interior substrate and the exterior substrate.

Yet another aspect of the present disclosure includes an aircraft window assembly having a pressure pane in abutting contact with an inner surface of an exterior pressure pane frame. A bezel is proximate a periphery of the pressure pane and defines an inner opening. The bezel includes an inner wall with a channel. An electro-optic element is disposed in the inner opening and is configured for reception in the channel of the inner wall. A dust cover is proximate the bezel. The dust cover includes an interior substrate and an exterior substrate.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF EMBODIMENTS

Figure 1:
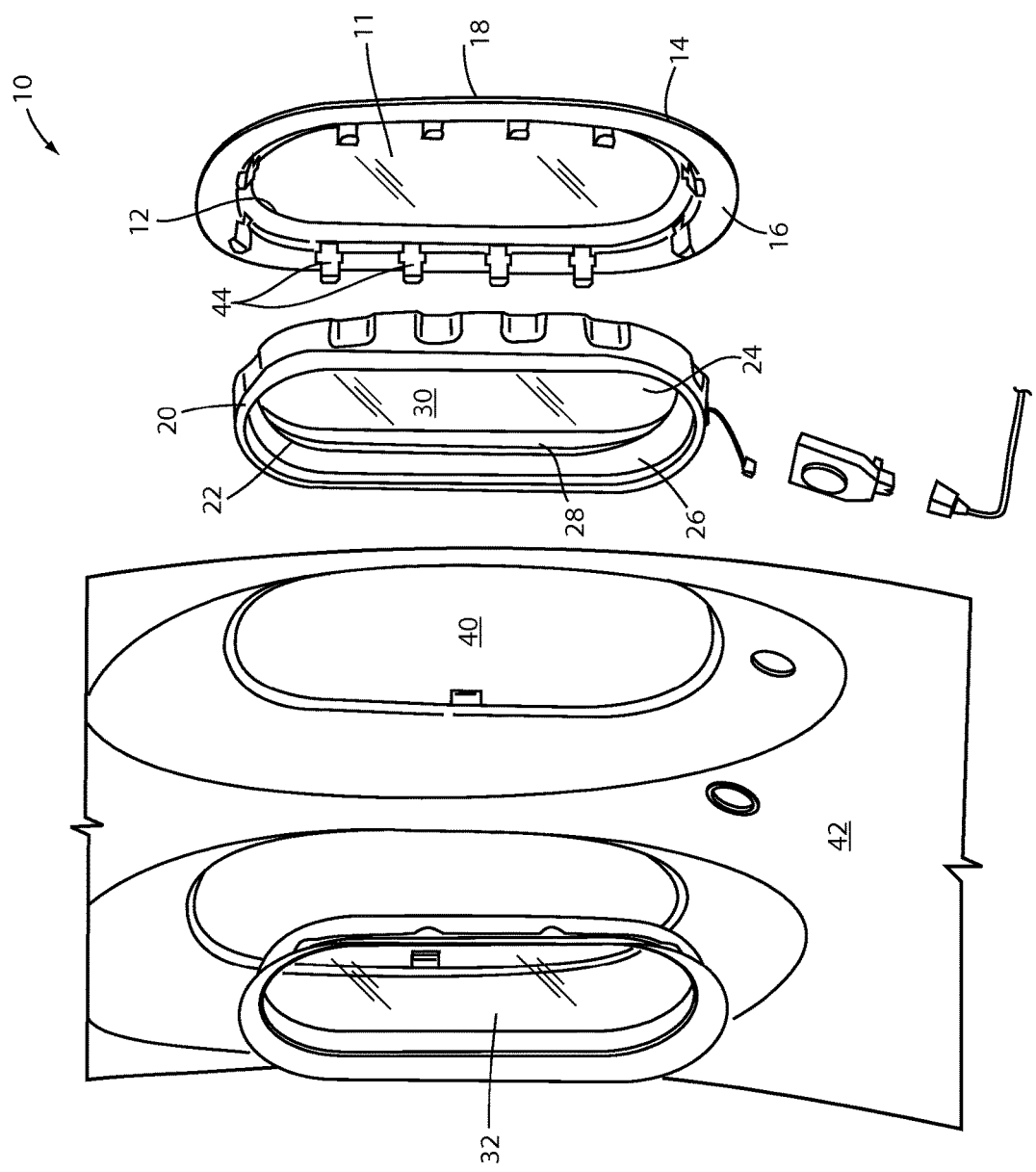
FIG. 1 is an exploded side perspective view of one embodiment of an aerospace protective dust cover of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
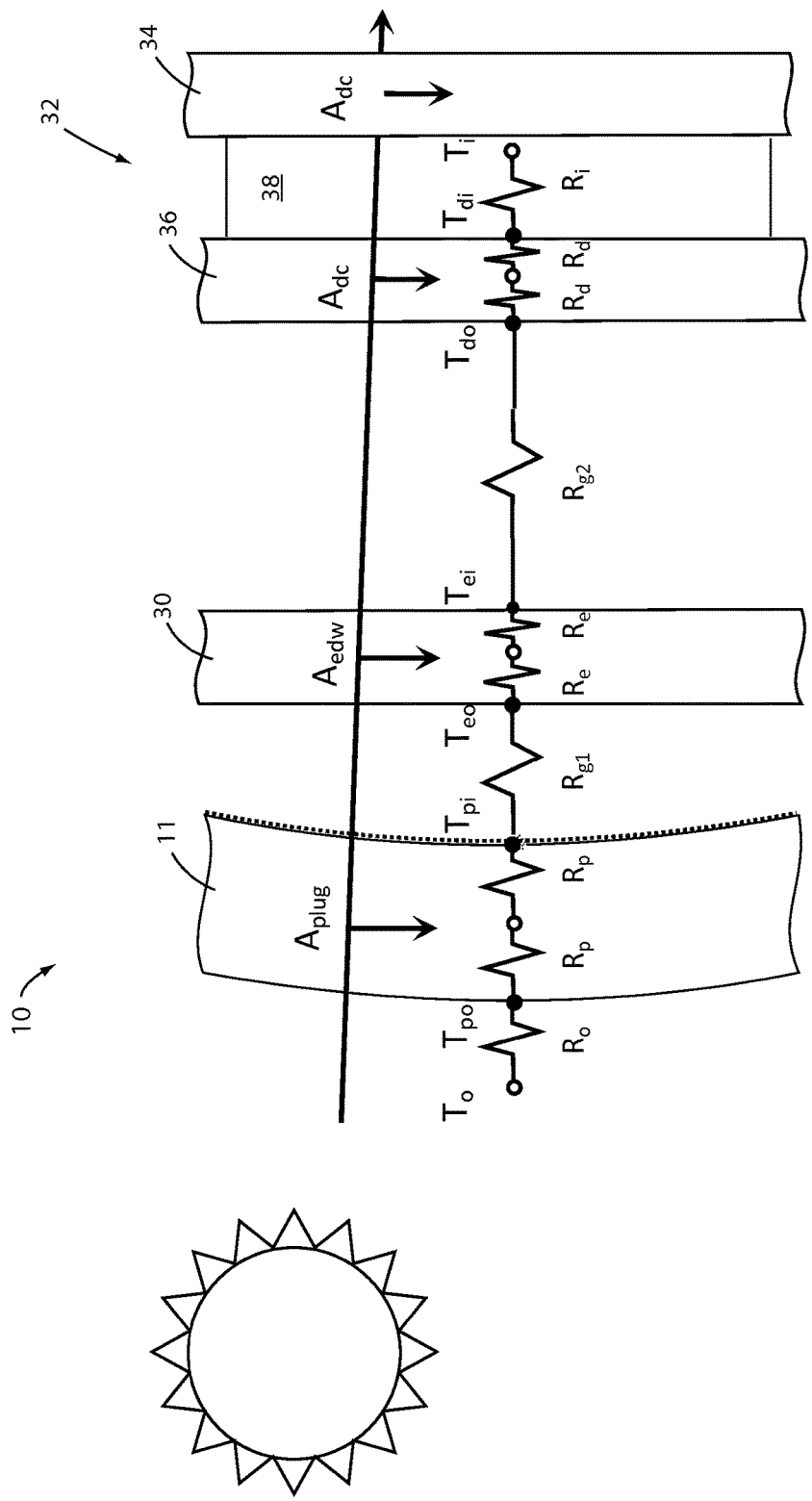
FIG. 2 is an enlarged partial cross-sectional view of the aerospace protective dust cover of FIG. 1.

Referring to FIGS. 1 and 2, reference numeral 10 generally designates an aircraft window assembly having a pressure pane 11 in abutting contact with an inner surface 12 of an exterior pressure pane frame 14. The pressure pane 11 includes an interior surface 16 and an exterior surface 18. The interior surface 16 includes an electrophoretic deposition. A bezel 20 is disposed proximate a periphery 22 of the pressure pane 11 and defines an inner opening 24. The bezel 20 includes an inner wall 26 with a channel 28. An electro-optic element 30 is disposed in the inner opening 24 and is configured for reception in the channel 28 of the inner wall 26. The electro-optic element 30 is capable of operation between a transmissive condition and a dimmed condition. A dust cover 32 is disposed proximate the bezel 20. The dust cover 32 includes an interior substrate 34 and an exterior substrate 36. A thermally absorbent material 38 is disposed in a structural gap 39 defined between the interior substrate 34 and the exterior substrate 36.

With reference again to FIGS. 1 and 2, the exterior pressure pane frame 14 is generally designed to be received in an aperture 40 defined in a sidewall 42 of the interior of an aircraft. The exterior pressure pane frame 14 supports the pressure pane 11, which is generally transparent to provide a view to a passenger seated inside the aircraft. A multitude of connectors 44 may be disposed about the exterior pressure pane frame 14 to secure the exterior pressure pane frame 14 to the fuselage (not shown) of the aircraft. The bezel 20 is generally positioned in abutting contact or close proximity to the exterior pressure pane frame 14. The bezel 20 may be of a foam construction with high flexibility and resiliency, but may also include a rigid construction.

With reference yet again to FIGS. 1 and 2, the illustrated bezel 20 closely receives the electro-optic element 30. The electro-optic element 30 is configured to extend into a channel 28 disposed in the inner wall 26 of the bezel 20. The electro-optic element 30 may include an electrochromic element or other dimming member such as that disclosed in commonly assigned U.S. Pat. No. 8,547,624, entitled "VARIABLE TRANSMISSION WINDOW SYSTEM," filed on Jun. 29, 2011, the entire disclosure of which is hereby incorporated herein by reference. The dust cover 32 is positioned inward of the bezel 20 and the exterior pressure pane frame 14. The dust cover 32 includes the interior substrate 34, as well as the exterior substrate 36, which are spaced a predetermined distance apart. In the illustrated embodiment, the space or gap between the interior substrate 34 and the exterior substrate 36 is approximately 14 mm to 45 mm. However, it will also be understood by one having ordinary skill in the art that the space between the interior substrate 34 and the exterior substrate 36 may be greater than 45 mm or less than 14 mm. It is also contemplated that the interior substrate 34 and the exterior substrate 36 may have a thickness of approximately 2 mm, although the interior substrate 34 and the exterior substrate 36 may have a thickness that is equal to, greater than, or less than 2 mm. The dust cover 32 is positioned on an interior side of the fuselage 42 and spaced a predetermined distance from the electro-optic element 30, which generally defines an electro-optic dimming window. The electro-optic dimming window will likely have a thickness of approximately 2.4 mm, although this thickness may be greater than or less than 2.4 mm.

With reference to the dust cover 32 illustrated in FIGS. 1 and 2, the space between the interior substrate 34 and the exterior substrate 36 may be filled with air, or some other gas, such as argon, nitrogen, etc., or another thermally absorbent material. Alternatively, the space may include a vacuum. Alternatively, the space between the interior substrate 34 and the exterior substrate 36 may be filled with a fluid, such as water or a liquid solvent. In yet another embodiment, a gelled liquid is used, such that the fluid has a very high viscosity. The interior substrate 34 and the exterior substrate 36 are formed from a polycarbonate material, or any other generally clear material that is approved for use in an aircraft. In the event that the space between the interior substrate 34 and the exterior substrate 36 is filled with air, small vent fins may also be placed proximate the gap to move air between the interior substrate 34 and the exterior substrate 36 to minimize any potential for condensation between the interior substrate 34 and the exterior substrate 36.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A window assembly for an aircraft, comprising:
   a pressure pane;
   a bezel proximate a periphery of the pressure pane and defining an inner opening, the bezel including an inner wall with a channel;
   an electro-optic element disposed in the inner opening and configured for reception in the channel of the inner wall, the electro-optic element being capable of operation between a transmissive condition and a dimmed condition;
   a dust cover proximate the bezel, the dust cover including an interior substrate and an exterior substrate, wherein the interior substrate and the exterior substrate generally define a gap therebetween; and
   a thermally absorbent liquid disposed in the gap.

2. The window assembly of claim 1, wherein the liquid is gelled.

3. The window assembly of claim 1, wherein the interior substrate is spaced a distance of approximately 14 mm to 45 mm from the exterior substrate.

4. The window assembly of claim 1, wherein the thermally absorbent liquid includes water.

5. The window assembly of claim 1, wherein the electro-optic element includes an electro-optic member.

6. A window assembly for an aircraft comprising:
a pressure pane in abutting contact with an inner surface of an exterior pressure pane frame, the pressure pane including an interior surface and an exterior surface, wherein the interior surface includes an electrophoretic deposition;
a bezel proximate a periphery of the pressure pane and defining an inner opening, the bezel including an inner wall with a channel;
an electro-optic element disposed in the inner opening and configured for reception in the channel of the inner wall, the electro-optic element being capable of operation between a transmissive condition and a dimmed condition; and
a dust cover proximate the bezel, the dust cover including an interior substrate and an exterior substrate.

7. The window assembly of claim 6, further comprising:
a thermally absorbent material disposed between the interior substrate and the exterior substrate.

8. The window assembly of claim 7, wherein the thermally absorbent material is water.

9. The window assembly of claim 7, wherein the thermally absorbent material is liquid.

10. The window assembly of claim 9, wherein the liquid is gelled.

11. The window assembly of claim 6, wherein the interior substrate is spaced a distance of approximately 14 mm to 45 mm from the exterior substrate.

12. The window assembly of claim 6, wherein the electro-optic element includes an electro-optic member.

13. A window assembly for an aircraft comprising:
a pressure pane in abutting contact with an inner surface of an exterior pressure pane frame;
a bezel proximate a periphery of the pressure pane and defining an inner opening, the bezel including an inner wall with a channel;
an electro-optic element disposed in the inner opening and configured for reception in the channel of the inner wall; and
a dust cover proximate the bezel, the dust cover including an interior substrate and an exterior substrate.

14. The window assembly of claim 13, further comprising:
a thermally absorbent material disposed between the interior substrate and the exterior substrate.

15. The window assembly of claim 14, wherein the thermally absorbent material is liquid.

16. The window assembly of claim 15, wherein the liquid is gelled.

17. The window assembly of claim 13, wherein the interior substrate is spaced a distance of approximately 14 mm to 45 mm from the exterior substrate.

18. The window assembly of claim 14, wherein the thermally absorbent material is water.

19. The window assembly of claim 13, wherein the electro-optic element includes an electro-optic member.

* * * * *